(12) United States Patent
Hatakeyama

(10) Patent No.: US 9,936,144 B2
(45) Date of Patent: Apr. 3, 2018

(54) IMAGING DEVICE AND SHOOTING METHOD CAPABLE OF GENERATING A BULB EXPOSURE IMAGE

(71) Applicant: Olympus Corporation, Shibuya-ku, Tokyo (JP)

(72) Inventor: Ryo Hatakeyama, Hino (JP)

(73) Assignee: Olympus Corporation, Tokyo (JP)

( * ) Notice: Subject to any disclaimer, the term of this patent is extended or adjusted under 35 U.S.C. 154(b) by 39 days.

(21) Appl. No.: 14/872,709

(22) Filed: Oct. 1, 2015

(65) Prior Publication Data
US 2016/0105596 A1  Apr. 14, 2016

(30) Foreign Application Priority Data
Oct. 8, 2014 (JP) .................. 2014-207084

(51) Int. Cl.
H04N 5/235 (2006.01)
H04N 5/232 (2006.01)

(52) U.S. Cl.
CPC ....... H04N 5/2355 (2013.01); H04N 5/23229 (2013.01)

(58) Field of Classification Search
CPC .......................... H04N 5/2355; H04N 5/23229
USPC .................................. 348/239, 222.1, 229.1
See application file for complete search history.

(56) References Cited

U.S. PATENT DOCUMENTS

| 2006/0082675 | A1* | 4/2006 | McGarvey | H04N 3/1568 348/362 |
| 2006/0291710 | A1* | 12/2006 | Wang | G06T 15/08 382/131 |
| 2009/0304275 | A1* | 12/2009 | Kodavalla | G06T 5/009 382/167 |
| 2013/0093909 | A1* | 4/2013 | Uchida | H04N 5/365 348/221.1 |
| 2014/0064554 | A1* | 3/2014 | Coulter | G06K 9/3216 382/103 |
| 2014/0313367 | A1* | 10/2014 | Iwasaki | H04N 5/2351 348/222.1 |
| 2015/0381995 | A1* | 12/2015 | Han | H04N 19/186 382/166 |
| 2017/0171474 | A1* | 6/2017 | Aota | H04N 5/2625 |
| 2017/0187941 | A1* | 6/2017 | Iwasaki | H04N 5/2352 |

FOREIGN PATENT DOCUMENTS

| JP | 2000-261715 | 9/2000 |
| JP | 2013-172372 | 9/2013 |

* cited by examiner

*Primary Examiner* — Antoinette Spinks
(74) *Attorney, Agent, or Firm* — John C. Pokotylo; Pokotylo Patent Services

(57) ABSTRACT

An imaging device, comprising a shooting control section for acquiring divided image data for each of a plurality of exposures, a determination section for determining, for every pixel data of the divided image data, whether or not a pixel value is within a specified determination threshold value, an image combination section for carrying out first image combination or second image combination for every pixel data of the divided image data, an image combination control section for selecting either the first image combination or the second image combination based on a determination result by the determination section, carrying out image combination for every pixel data in the image combination section in accordance with this selection, and generating combined image data, and a first storage section for storing the combined image data that has been generated as a result of controlled by the image combination control section.

14 Claims, 11 Drawing Sheets

IMAGING DEVICE AND SHOOTING METHOD CAPABLE OF GENERATING A BULB EXPOSURE IMAGE

Benefit is claimed, under 35 U.S.C. § 119, to the filing date of prior Japanese Patent Application No. 2014-207084 filed on Oct. 8, 2014. This application is expressly incorporated herein by reference. The scope of the present invention is not limited to any requirements of the specific embodiments described in the application.

BACKGROUND OF THE INVENTION

1. Field of the Invention

The present invention relates to an imaging device, such as a digital camera, with which it is possible to generate a bulb shooting image through image combination, and to an imaging device and shooting method capable of displaying a time-lapse image during bulb shooting.

2. Description of the Related Art

In the case of shooting a subject where subject brightness is dark, such as celestial body shooting, shooting methods, such as bulb shooting where exposure is carried out with a prolonged exposure time, are conventionally known. With bulb shooting etc., since it is difficult to set an exposure time to give correct exposure, means are known for successively acquiring divided exposure image data which has been exposed at specified time intervals, and subjecting these divided exposure image data to multiple combination to acquire a single taken image with correct exposure.

Generally, with this type of subject image, since the contrast in subject brightness in the subject image is often large, if the photographer carries out multiple combination on a main subject such as a celestial bodies (stars) so as to achieve correct exposure, there may be situations where correct exposure is not acquired, such as overexposure of subject images other than the main celestial bodies.

There have been various proposals of technology for acquiring correct exposure images with this type of combining of a plurality of images that have been acquired using multiple exposure (refer, for example, to Japanese patent number 4565504 (hereafter referred to as Patent Literature 1), and Japanese patent number 4148586 (hereafter referred to as Patent Literature 2)). In Patent Literature 1 and Patent Literature 2 it is disclosed that divided exposure image data is acquired by carrying out shooting a plurality of times at specified time intervals, and when these divided exposure image data are subjected to image combination processing comparatively bright combination processing is carried out for every divided exposure image data. Here, the comparatively bright combination processing is a technique of comparing pixel data of two images for every pixel, and performing combination processing by selecting pixel data that has the largest brightness output.

With only additive combination of the divided exposure image data, for example, when taking pictures of star trails in celestial body shooting, with normal longer exposure time shooting, in cases where buildings etc. other than the stars exist as a background bright portions of the buildings will be blown out. By contrast, in the case of carrying out comparatively bright combination processing, because simple pixel value addition is carried out, buildings have a fixed brightness and it becomes possible to shoot star trails with correcting exposure for the buildings.

SUMMARY OF THE INVENTION

The present invention provides an imaging device and shooting method capable of simply adjusting starting point and length of trails of arbitrary brightness in accordance with the photographer's intentions, while looking at the subject image during exposure.

An imaging device of the present invention comprises an exposure control section for subjecting a subject image that has been formed on an imaging surface to photoelectric conversion and acquiring divided image data for each of a plurality of exposures, a determination section for determining, for every pixel data of the divided image data, whether or not a pixel data is within a specified determination threshold value, an image combination section for carrying out first image combination or second image combination for every pixel data of the divided image data, an image combination control section for selecting either the first image combination or the second image combination based on a determination result by the determination section, carrying out image combination for every pixel data in the image combination section in accordance with this selection, and generating combined image data, and a first storage section for storing the combined image data that has been generated as a result of controlled by the image combination control section.

A shooting method of the present invention comprises an image forming step of subjecting a subject image that has been formed on an imaging surface to photoelectric conversion and acquiring divided image data for each of a plurality of exposures, a determination step of determining, for every pixel data of the divided image data, whether or not a pixel value is within a specified determination threshold value, an image combination step of selecting either first image combination or second image combination based on a determination result in the determination step, carrying out image combination for every pixel data in accordance with this selection, and generating combined image data, and a storage step of storing the combined image data that was generated in the image combination step.

DETAILED DESCRIPTION OF THE PREFERRED EMBODIMENTS

An example where a digital camera is adopted as a preferred embodiment of the present invention will be described in the following. This camera has an imaging section, with a subject image being converted to image data by this imaging section, and the subject image being subjected to live view display on a display section arranged on the rear surface of the camera body based on this converted image data. A photographer determines composition and photo opportunity by looking at a live view display. At the time of a release operation image data is stored in a storage medium. Image data that has been stored in the storage medium can be subjected to playback display on the display section if playback mode is selected.

Also, this camera carries out exposure at specified time intervals when performing bulb shooting (this exposure will be referred to as divided exposure), and carries out image combination using divided exposure image data that has been acquired through this divided exposure. In this image combination, processing for image combination, such as comparatively bright combination and comparatively dark combination (or averaged combination), is changed in accordance with pixel data and a threshold value that has been input by manual operation by the photographer. As a result in this change of image processing it becomes possible to acquire an image in line with the photographers desired intentions (refer, for example, to FIG. 2A, FIG. 2B and FIG. 7).

First, a first embodiment of the present invention will be described using FIG. 1 to FIG. 6. With this embodiment, a brightness level range is designated by operation by the photographer, pixel data and the brightness level range are compared, and based on the results of this comparison change to comparatively bright combination or comparatively dark combination (or averaged combination) is carried out.

Figure 1:
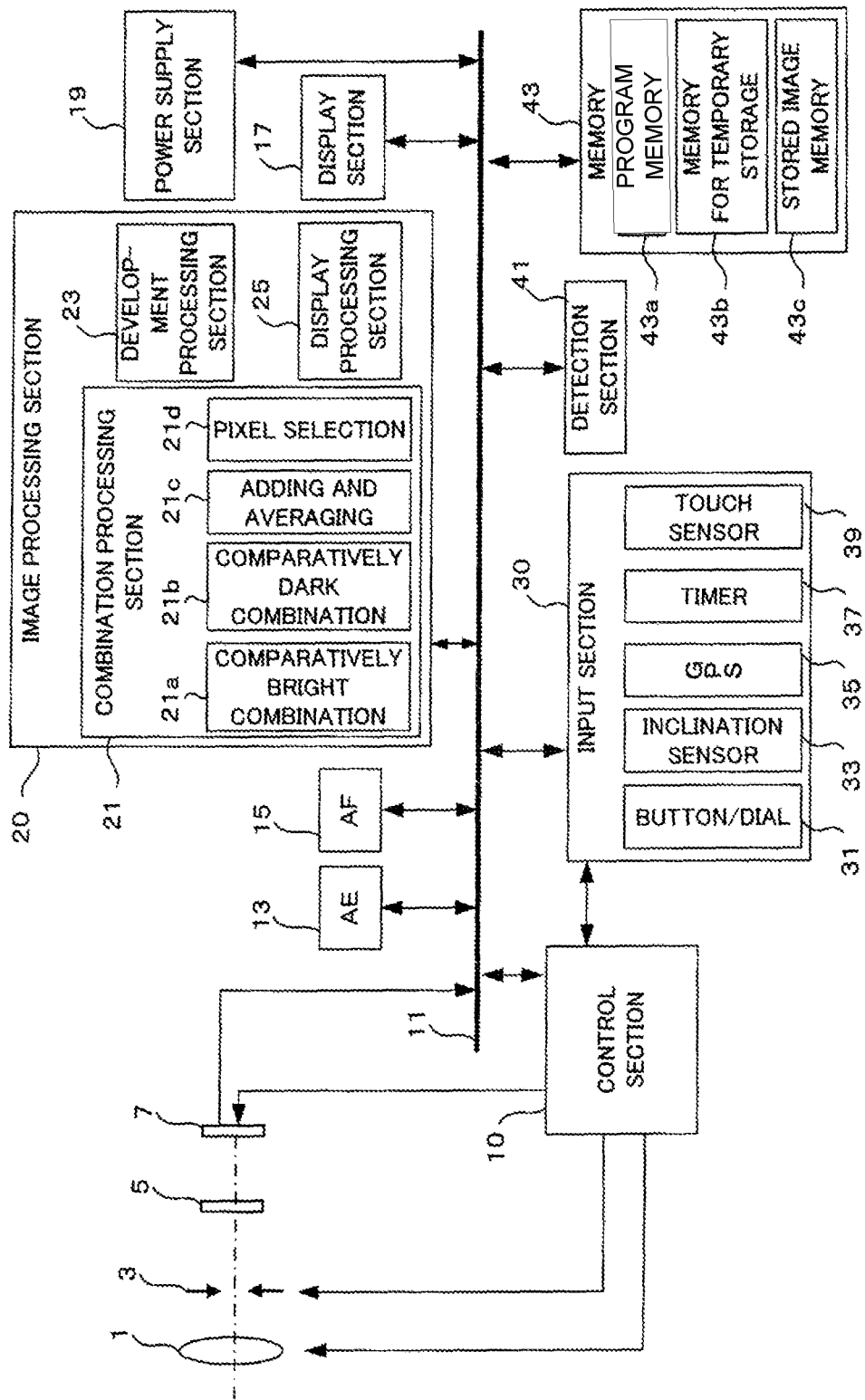
FIG. 1 is a block diagram mainly showing the electrical structure of a camera of a first embodiment of the present invention.

FIG. 1 is a block diagram mainly showing the electrical structure of the camera 100 of this embodiment. This camera comprises a photographing lens 1, diaphragm mechanism 3, shutter 5, image sensor 7, control section 10, bus 11, AE processing section 13, AF processing section 15, display section 17, power supply section 19, image processing section 20, input section 30, detection section 41 and memory section 43. A lens barrel containing the photographing lens 1 and the diaphragm mechanism 3 may be formed integrally with the camera body, or may be formed as an interchangeable lens barrel.

The photographing lens 1 includes a plurality of optical lenses, such as a zoom lens and the focus lens, and forms an optical image on an imaging surface of the image sensor 7. The photographing lens 1 has a drive mechanism for moving a zoom lens and the focus lens along an optical axis direction, and the control section 10 controls focus lens position in order to focus based on output of the AF processing section 15, which will be described later.

The diaphragm mechanism 3 is arranged within the optical path of the photographing lens 1, and is constructed so as to open and close, with opening diameter being changed in order to adjust light amount of shooting light flux that is incident on the image sensor 7. Opening diameter of the diaphragm mechanism 3 is drive controlled by the control section 10. Specifically, an aperture value for achieving correct exposure is controlled by the control section 10 based on output of the AE processing section 13.

The shutter 5 is arranged within the optical path of the photographing lens 1, and is constructed so as to switch between a state where shooting light flux to the imaging surface of the image sensor 7 is blocked, and a state where the light flux is exposed. Exposure time of the image sensor 7 is adjusted by this shutter 5. Opening time (exposure time) of the shutter 5 is controlled by the control section 10 based on output of the AE processing section 13.

The image sensor 7 has an imaging surface where shooting light flux from a subject that has been focused by the photographing lens 1 is formed into an image. A plurality of pixels are arranged two-dimensionally on the imaging surface of the image sensor 7, and color filters are provided on an incident surface side. Each pixel of the image sensor 7 converts an optical image (subject image), corresponding to shooting light flux that has been formed into an image on the imaging surface, to an analog image signal in accordance with the light amount. This analog image signal is converted to a digital signal (a digital signal corresponding to an analog image signal will simply be referred to as "image data") by an A/D converter (not shown), and output to the bus 11.

The bus 11 is a bus line for transmitting and receiving various data. The AE processing section 13 is input with image data via the bus 11 and extracts subject brightness information from this image data, while the control section 10 calculates exposure time for the shutter 5 and aperture value for the diaphragm mechanism 3 such that an exposure level becomes appropriate, based on the subject brightness information.

The AF processing section 15 is input with image data via the bus, and a focused state of the subject is detected based on a contrast value relating to the intensity of high-frequency components of spatial frequencies of this image data. Based on the results of this detection, the control section 10 adjusts focus position of the photographing lens 1, as was described previously.

The image processing section 20 comprises a combination processing section 21, a development processing section 23, and a display processing section 25. The combination processing section 21 comprises a comparatively bright combination section 21a, a comparatively dark combination section 21b, an adding/averaging processing section 21c, and a pixel selection section 21d, and carries out combination processing such as comparative combination processing, averaging combination processing or adding processing based on image data that has been input via the bus 11 and the detection result of the detection section 41 to generate image data. The combination processing section 21 functions as an image combination section for carrying out first image combination or second image combination for every pixel data of divided image data.

The comparatively bright combination section 21a compares pixel data for pixels at respectively corresponding positions in two sets of image data, and combines images by selecting a larger of the two pixel data. In other words, the comparatively bright combination section 21a compares brightness output of pixel data of divided image data and brightness output of pixel data of combined image data, selects pixel data for which brightness output is largest, and carries out combination processing as new combined image data (also referred to first image combination). When carrying out comparatively bright combination for the first time, the combination is carried out using two sets of divided image data.

The comparatively dark combination section 21b compares pixel data for pixels at respectively corresponding positions in two sets of image data, and combines images by selecting a smaller of the two pixel data. The comparatively bright combination section 21a and the comparatively dark combination section 21b may also be configured to select the larger or the smaller of the pixel data only in a case where a difference value for pixel data of pixels of corresponding positions is greater than the threshold value. In other words, the comparatively dark combination section 21b compares pixel data of the divided image data and brightness output of pixel data of the combined image data, selects pixel data for which brightness output is smallest, and carries out combination processing as new combined image data (also referred to second image combination). When carrying out comparatively dark combination for the first time, the combination is carried out using two sets of divided image data.

The adding/averaging processing section 21c combines images using average values of pixel data of corresponding pixels. The pixel selection section 21d sequentially selects pixel data from among image data that has been input via the bus 11 (refer to S51-S61 in FIG. 5, which will describe later).

The development processing section 23 carries out various image processing such as tone conversion processing, white balance correction, edge processing, and combination processing for wide dynamic range image data etc. on image data that has been generated by the combination processing section 21 or on image data that has been generated by the display processing section 25. This development processing section 23 outputs image data that has been subjected to various image processing to the bus 11.

The display processing section 25 creates image data by carrying out image processing for display on image data that has been input via the bus 11 or image data that has been generated by the combination processing section 21, using processed data from the detection section 41, and outputs the created image data to the bus 11.

The display section 17 has a display panel such as an LCD panel or an organic EL panel arranged on the rear surface or the like of the camera body, and/or a display monitor such as an electronic viewfinder. The display section 17 displays a subject image based on image data that has been generated by the development processing section 23 and subjected to display processing by the display processing section 25, and displays other information.

Figure 2A:
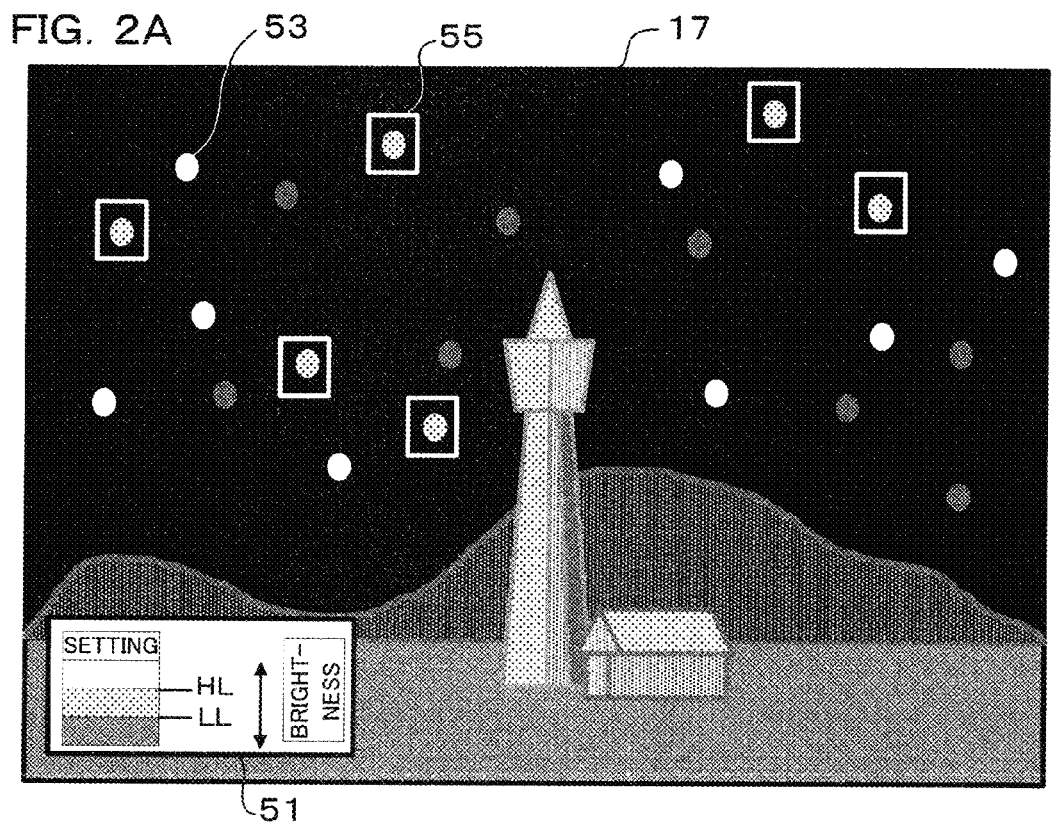
FIG. 2A and FIG. 2B show combined images in the case of carrying out celestial body shooting, for the camera of the first embodiment of the present invention.
Figure 3:
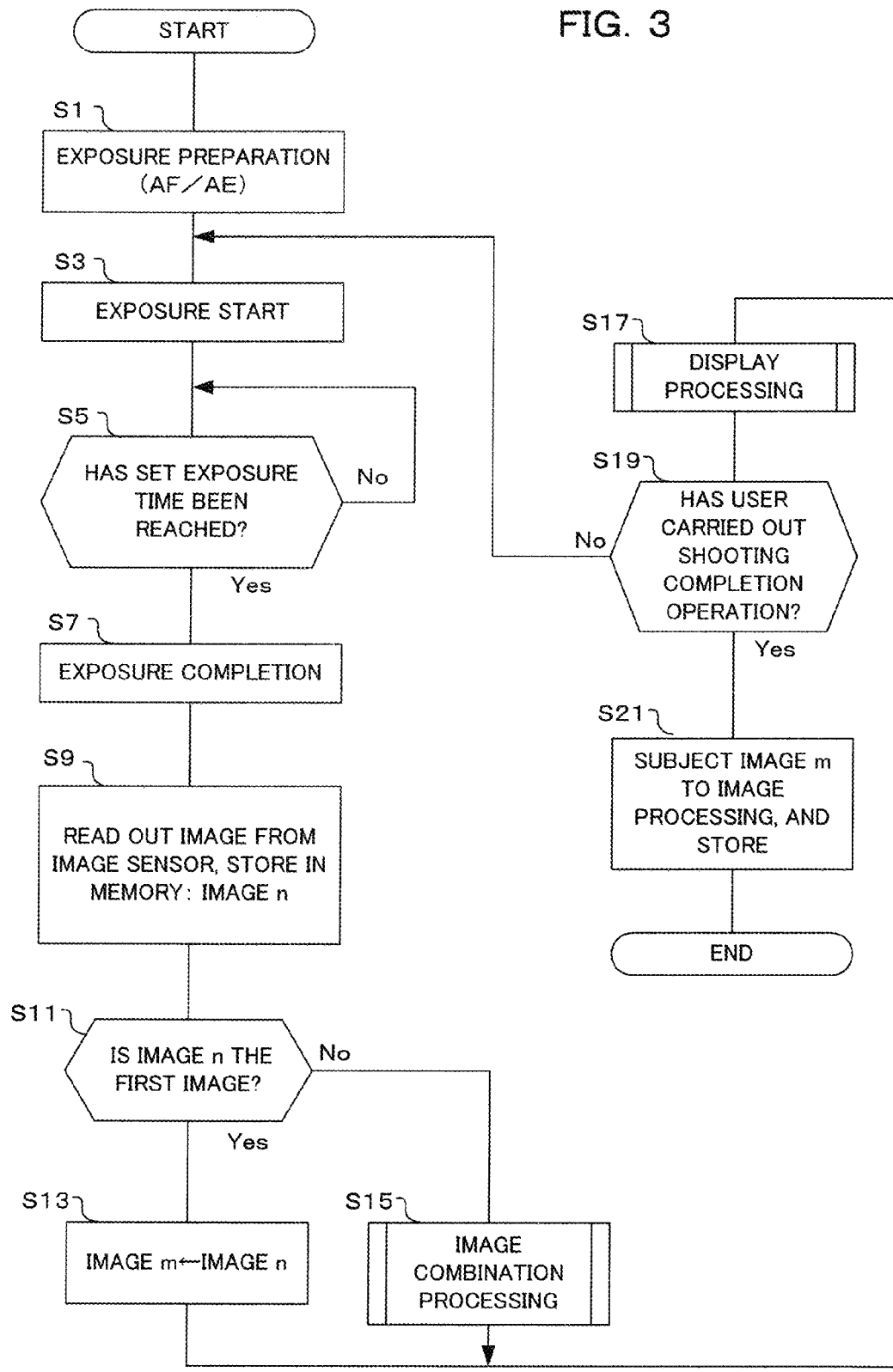
FIG. 3 is a flowchart showing main operation of the camera of the first embodiment of the present invention.
Figure 6:
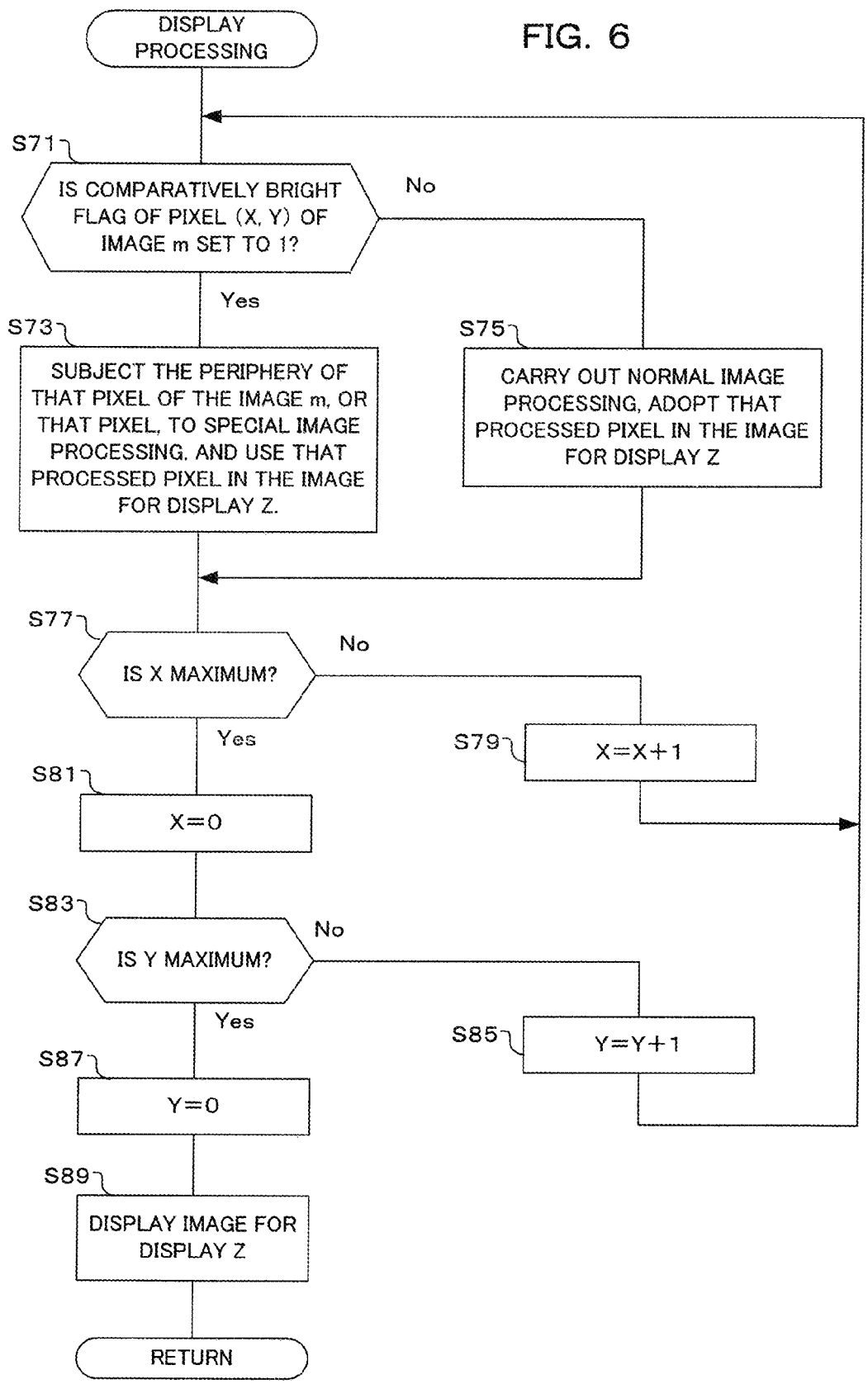
FIG. 6 is a flowchart showing operation of display processing for the camera of the first embodiment of the present invention.

The display section 17 functions as a display section for updating display of a combined image every time combined image data is generated by the image combination control section (refer, for example, to S17 in FIG. 3, and to FIG. 6). The display section 17 also functions as a display section for displaying a combined image based on combined image data, and this display section performs display of a position, where a pixel value has been determined to be within specified determination threshold values by the determination section, superimposed on the combined image (refer, for example, to frame 55 in FIG. 2A and S73 in FIG. 6). A power supply section 19 supplies power to the entire camera.

The input section 30 includes a button/dial 31, an inclination sensor 33, a GPS (Global Positioning System) 35, a timer 37, and a touch sensor 39, is input with various mode settings of the camera and various operations such as a release operation, and acquires information such as camera orientation, location and time etc. Specifically, the button/dial 31 is various operation members such as a power switch, a release button, a mode dial, and a cross-shaped button. Also, the inclination sensor 33 detects an inclined state of the camera. The GPS 35 detects current position of the camera. The timer 37 carries out timing operations and outputs information relating to current time, such as the year, month and day. The touch sensor 39 is arranged on the front surface or the like of a display panel etc. of the display section 17, and detects touch operations etc. by the photographer.

The detection section 41 carries out detection processing based on information from the input section 30. In more detail, the type of operation input is detected based on operation input signals from various input members etc. of the input section 30. As one example, with operation input from the touch sensor 39, position of an image region that has been indicated by the photographer on image output that has been output to the display section 17 is detected, and for a setting operation input display that has been output to the display section 17 the position that the photographer has designated etc. is detected.

The memory 43 has the program memory 43a, a memory for temporary storage 43b, and a memory for image storage 43c. The program memory 43a holds various programs for driving of the camera by the control section 10, and photographer setting data etc. Also, the memory for temporary storage 43b temporarily stores image data that has been read out from the image sensor 7, and is also used as a work memory for various processing in the image processing section 20. The memory for image storage 43c stores image data that has been subjected to processing for storage. This memory for image storage 43c is a non-volatile memory, such as card memory, and can be inserted into and taken out of the camera. The memory for image storage 43c also functions as a first storage section for storing combined image data that has been generated as a result of control using the image combination control section (for example, refer to S21 in FIG. 3).

The control section 10 has a processor such as the CPU, and controls each section within the camera in accordance with program code that have been stored in the program memory 43a. This control section 10 functions as an imaging control section for controlling exposure amount for shooting, and controlling imaging timing, for example. The control section 10 also constitutes part of an A/D conversion control section. Control is also carried out to drive the photographing lens 1 to a focus position. Control is also carried out so that the diaphragm mechanism 3 reaches a specified opening diameter. Control of exposure time of the shutter 5 is also carried out.

The control section 10 also functions as a shooting control section, in cooperation with the image sensor 7, to carry out photoelectric conversion on a subject image that has been formed on the imaging surface, and acquire divided image data for each of a plurality of exposures (refer, for example, to S3-S9 in FIG. 3). The control section 10 also functions as a determination section for determining, for every pixel data of the divided image data, whether or not that pixel data is within a specified determination threshold value (refer, for example, to S31, S33 and S37 in FIG. 4). The control section 10 also functions as an image combination control section, in cooperation with the combination processing section 21, for selecting either first image combination or second image combination based on a determination result by the determination section, carrying out image combination for every pixel data in the image combination section in accordance with this selection, and generating combined image data (refer, for example, to S35, S39, and S41 in FIG. 4).

Next, operation screens and combined images (time-lapse images) of this embodiment will be described using FIG. 2A and FIG. 2B. FIG. 2A shows a live view image that is displayed on the display section 17 when live bulb mode has been set in order to carry out celestial body shooting. With this example, a background (mountains, tower, house etc.) is displayed together with a plurality of stars 53. Also, a setting section 51 for brightness range setting is displayed at the lower left of the screen.

The setting section 51 for brightness range setting shows brightness at the left side, and the photographer sets an upper limit threshold value HL and a lower limit threshold value LL for brightness range they want to store at the time of shooting, using the cross shaped button and the touch panel. The word "setting" is shown, to indicate to the photographer that it is possible to set a brightness range. If the upper limit threshold value HL and the lower limit threshold value LL for brightness range have been set, then in this embodiment, as will be described later, subjects that are in this brightness range (with this example, the stars 53) are displayed with a frame 55 so that they can be identified.

Figure 2B:
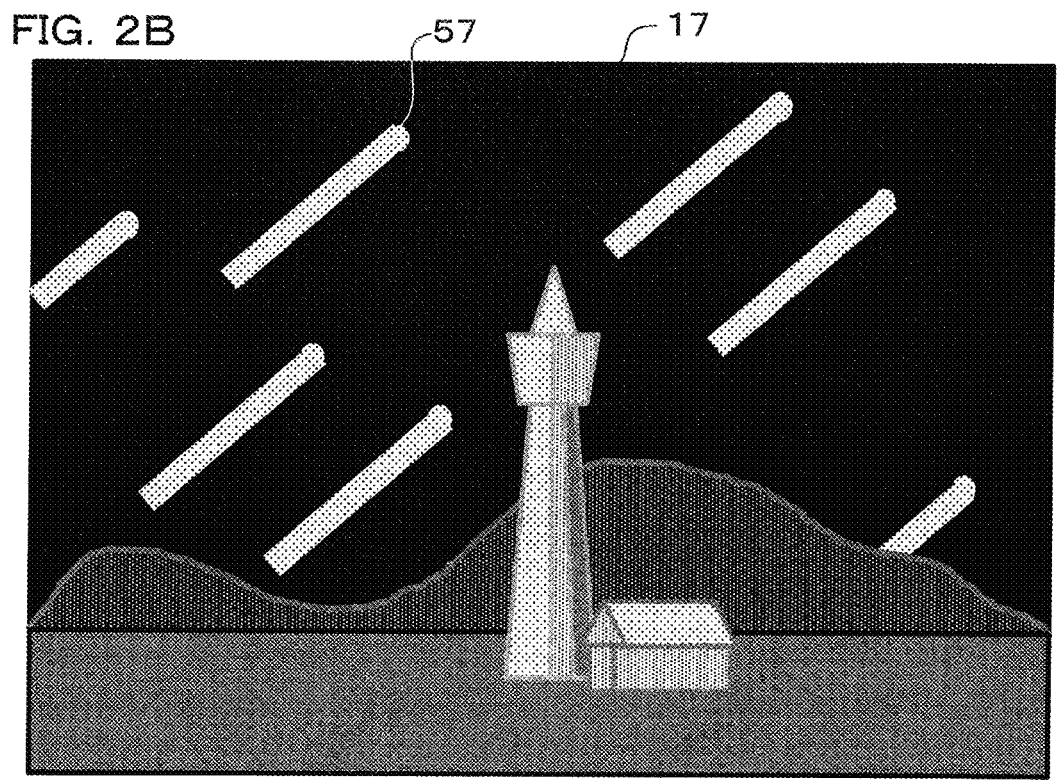

With the example shown in FIG. 2A, a moderate brightness range is set by the photographer in the setting section 51, and image combination is carried out so as to depict movement trails of subjects of that range of brightness (refer to FIG. 2B). As a result, it is possible to obtain an image in line with the photographer's intentions by realizing a combined image that does not depict movement trails of all moving bodies (stars 53), but only depicts movement trails of moving bodies having a brightness in the range that has been set using the setting section 51.

Next, operation of this embodiment will be described using the flowcharts shown in FIG. 3 to FIG. 6. These flowcharts are executed by the control section 10 in accordance with programs stored in the program memory 43a (the same also applies to the flowcharts shown in FIG. 8 to FIG. 10, which will be described later). In this flowchart, description is specific to a multiple exposure shooting operation for acquiring image data for a plurality of divided exposures, and generating single bulb shooting image data by carrying out combination processing for a plurality of divided exposure image data.

Exposure commencement processing is commenced by the photographer operating the release button. As the exposure commencement processing, first of all exposure preparation (AF/AE) is carried out (S1). Here, the AF processing section 15 acquires focus information based on a taken image (live view image) that has been acquired from the image sensor 7. Based on the acquired focus information, the control section 10 performs autofocus control so that position of a focus lens for focus adjustment within the photographing lens 1 is at the focus position (AF processing).

Also, the AE processing section 13 acquires subject brightness information based on a taken image (live view image) that has been acquired from the image sensor 7. The control section 10 calculates diaphragm size set for the diaphragm mechanism 3 and exposure time set for the shutter 5 based on the subject brightness information has been acquired. The control section 10 controls aperture stop position for the diaphragm mechanism 3 so as to give an aperture stop that is based on the calculated diaphragm size (automatic exposure control (AE) processing).

At the time of bulb shooting, the shutter 5 is opened and exposure commences if the photographer presses the shutter button, and the shutter 5 is then closed and exposure completed when the photographer stops pressing the shutter button (or presses the shutter button again). As will be described later, at the time of bulb shooting involving multiple exposure combination, such as comparatively bright combination, from the commencement of exposure until completion of exposure, every time a divided exposure time, that has been manually set by the photographer or automatically set in accordance with brightness, elapses, image data is repeatedly read out from the image sensor 7 and output to the bus 11.

Once the exposure preparation has been carried out in step S1, next exposure commences (S3). Here, the control section 10 causes the shutter 5 to open, and the subject image that has passed through the photographing lens 1 is made incident on the imaging surface of the image sensor 7. Also, at the same time as exposure is commenced, the timer 37 is reset and a timer operation commences.

Once exposure has commenced in step S3, it is next determined whether or not the exposure time that has been set is reached (S5). Whether or not a manually set or automatically set divided exposure time has elapsed once exposure has commenced in step S3 is determined based on time information of the timer 37. If the result of this determination is that the exposure time has not elapsed, the determination processing of step S5 is return to again.

If the result of determination in step S5 is that the set exposure time has been reached, exposure is completed (S7), image data is read out from the image sensor 7, and the image data is saved to the memory for temporary storage 43b as image n (S9). Here, exposure of the image sensor 7 is completed and image data is read out. n represents a shooting order for divided exposure images, with n=1 being a first image, and subsequently n is incremented by one every time divided exposure is carried out (n: nth divided exposure image data that has been sequentially acquired by dividing exposure, n=1, 2, initialization value is 1). Completion of exposure may be carried out using an electronic shutter of the image sensor 7 or using the shutter 5.

If image data has been saved to the memory for temporary storage 43b in step S9, it is next determined whether or not image n is the first image (S11). As described previously, for an initial divided image n=1. In the event that the image is the first image, it is saved, whereas if the image is a second or subsequent image, image combination is carried out.

If the result of determination in step S11 is that image n is the first image, then image n is moved to image m (S13). Here, divided exposure image data of a divided image that has been read out in step S9 is temporarily stored as image m (time-lapse image) in the memory for temporary storage 43b.

On the other hand, if the result of determination in step S11 is that image n is not the first image, image combination processing is carried out (S15). Here, since the image is the second or subsequent image, image combination is carried out by the combination processing section 21. As will be described later, for pixel data of divided exposure image data that has been temporarily stored as image n, and pixel data of image data of a time-lapse image that has been temporarily stored as image m, pixel data and the brightness range that was set in the setting section 51 of FIG. 2A are compared for every respectively corresponding pixel data, and based on the comparison result comparatively bright combination or comparatively dark combination (or averaged combination) is carried out, and a time-lapse image that has been combined is temporarily stored as image m. Detailed operation of this image combination processing will be described later using FIG. 4 and FIG. 5.

Once image n has been moved to image m in step S13, or if image combination processing has been carried out in step S15, next display processing is carried out (S17). Here, the development processing section 23 and the display processing section 25 carry out processing for display on image data of an initial image that was stored in step S13 or on image data of a time-lapse image that was subjected to combination processing in step S15, and the initial image or time-lapse image is displayed on the display section 17. Detailed operation of this display processing will be described later using FIG. 6.

If display processing has been carried out in step S17, it is next determined whether or not shooting is complete, that is, it is determined whether or not the photographer has carried out a shooting completion operation (S19). Determination here is based on operating state of an operating member of the input section 30, such as the release button. If the result of this determination is that a shooting completion operation has not been carried out, processing returns to step S3, and operations such as the divided exposure, image combination processing, and display of the time-lapse image etc. are repeated.

On the other hand, if the result of determination in step S19 is that a shooting completion operation has been carried out, the image m is subjected to image processing and stored (S21). Here, image combination and development processing etc. are performed by the image processing section 20, and image data of the time-lapse image that is being stored as image m is saved to the memory for image storage 43c as final shooting image data. If the image data has been saved, the shooting operation is completed.

Next, the image combination processing of step S15 will be described using FIG. 4 and FIG. 5. In the description of this flowchart, image n is made divided exposure image data In that has been shot an $n^{th}$ time, and image m is made combined image data Sm that has been shot an $m^{th}$ time and subjected to combination processing. Pixel brightness outputs In (X,Y) and Sm(X, Y) that have been acquired from pixels corresponding to respective two-dimensional image coordinates (X, Y) are included in the divided exposure image data In and the combined image data Sm.

Also, a "comparatively bright flag" is set as a state variable for determining the type of combination processing in the combination processing section 21. This variable is set to a value of 1 or 0, and in the case where 1 has been set in the comparatively bright flag, the combination processing section 21 carries out combination processing by means of the comparatively bright combination processing section 21a. On the other hand if 0 has been set in the comparatively bright flag, the combination processing section 21 carries out combination processing using the comparatively dark combination processing section 21b or the adding/averaging processing section 21c.

Figure 4:
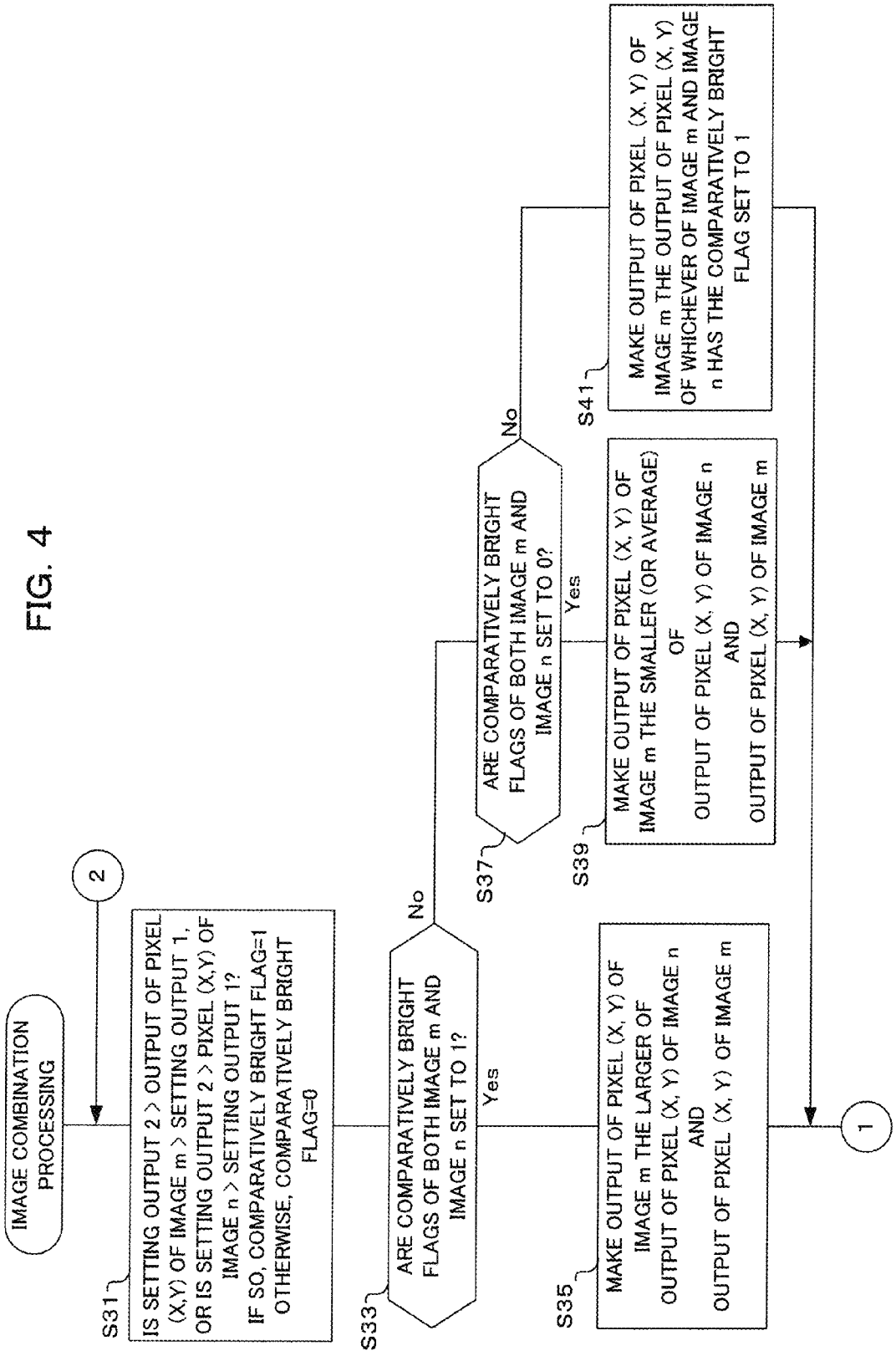
FIG. 4 is a flowchart showing operation of image combination processing for the camera of the first embodiment of the present invention.

If the flow for image combination processing of FIG. 4 is entered, first comparison of pixel data for the image m and setting outputs is carried out, and condition setting for the comparatively bright flag is carried out (S31). Specifically, the comparatively bright flag is set to 1 in the case where setting output 2>output of pixel (X, Y) of image m>setting output 1, or in the case where setting output 2>output of pixel (X, Y) of image n>setting output 1, and in any other case the comparatively bright flag is set to 0. Here, setting output 1 corresponds to the lower limit value LL for the brightness range of the setting section 51 in FIG. 2A, and setting output 2 corresponds to the upper limit value HL for the brightness range.

In this step S31, respective two dimensional (X,Y) brightness outputs for the divided exposure image data In and the combined image data Sm are compared for every pixel output, and the type of combination processing (compara-
tively bright combination, comparatively dark combination etc.) carried out for each pixel is determined. Here determination of a brightness output value In (X, Y) for each pixel of the divided exposure image data In, and a brightness output value Sm (X, Y) for each pixel of the combined image data Sm, is based on specified determination conditions. Here, the specified determination condition is shown as a condition for the case where the comparatively bright flag has been set to 1 (that is, a case where comparatively bright combination is selected as the type of combination processing).

Threshold values for the determination condition are constituted by an upper limit value for specified pixel output (value shown as setting output 2 in step S71, the upper limit value HL in FIG. 2A), and a lower limit value for specified pixel output (value shown as setting output 1 in step S71, the lower limit value LL in FIG. 2A). The upper limit value and lower limit value constituting the determination threshold values for specified pixel output can be set by the photographer on the display screen (refer to the setting section 51 in FIG. 2A).

In step S31, it is determined whether or not respective brightness output value In(X, Y) for each pixel of the divided exposure image data n, and respective brightness output value Sm(X, Y) for each pixel of the combined image data m, are in a range indicated from the lower limit value (value shown as setting output 1, lower limit value LL) to the upper limit value (value shown as setting output 2, upper limit value HL) for a specified pixel output.

In the event that the above described determination conditions are satisfied, the type of combination processing to be carried out later is selected as comparatively bright combination processing which will be carried out by the comparatively bright combination processing section 21a (as the output for this step, the comparatively bright flag is set to 1). These determinations are carried out for every pixel (X, Y) that is arranged two dimensionally. As one example, initially both pixel outputs corresponding to the coordinates X=0, Y=0 are determined. Next, a determination is carried out by comparing values for the brightness output value In(X, Y) for each pixel of the divided exposure image data n and brightness output values Sm (X, Y) for each pixel of the combined image data m, in the X direction. As another method, processing proceeds in the order of first carrying out comparative determination with pixel output in the X direction as an object of comparison, and then carrying out comparative determination of both pixel outputs in the Y direction (vertical direction). Accordingly, it is possible to adopt either method, either of the case of initially carrying out sequential comparison in a line direction (X direction), or a method of initially sequentially comparing in a column direction (Y direction).

In this way, in step S31, for image data that has been stored as image m and image data that has been stored as image n, a value of the comparatively bright flag, which is determination result information of the combination processing section 21, is set for pixel output at each coordinate (X, Y) based on the above described determination conditions. If setting of the comparatively bright flag has been carried out in step S31, then in step S33 and after, which of comparatively bright combination or comparatively dark combination, or replacement, is determined based on the state of the comparatively bright flag, and combination processing is carried out based on the determination result.

First, it is determined whether or not both the image m and the image n have the comparatively bright flag set to 1 (S33).

Here, determination is carried out for every pixel, based on the comparatively bright flag that has been set for every pixel in step S31.

If the result of determination in step S33 is that the comparatively bright flags of both image m and image n are set to 1, then comparatively bright combination is carried out for both image m and image n (S35). Specifically, output of pixel (X, Y) for image m is made the larger of the output of pixel (X, Y) for image n and the output of pixel (x, y) for image m. The processing for this case is carried out by the comparatively bright combination processing section 21*a*.

The comparatively bright combination step S35 involves carrying out combination processing using comparatively bright combination processing on the values of the brightness output value In (X, Y) for each pixel in the divided exposure image data n, and the brightness output value Sm(X, Y) for each pixel in the combined image data m, and newly creating combined image data Sm+1(X,Y) that has been generated the m+1$^{th}$ time. In more detail, outputs of the brightness output value In(X, Y) for each pixel in the divided exposure image data n, and the brightness output value Sm(X, Y) for each pixel in the image data that have been subjected to combination processing the m$^{th}$ time, are compared, and the image data Sm+1(X, Y) after combination processing is made an output value that is the larger output.

On the other hand, if the result of determination in step S33 is that the comparatively bright flags of both image m and image n are not set to 1, it is next determined whether or not the comparatively bright flags of both image m and image n are set to 0 (S37). Here, determination is carried out every pixel, based on the comparatively bright flag that has been set for every pixel in step S31.

If the result of determination in step S37 is that the comparatively bright flags of both image m and image n are set to 0, then comparatively dark combination (or averaging processing) is carried out using both image m and image n (S39). Specifically, output of pixel (X,Y) for image m is made the smaller (or the average) of the output of pixel (X,Y) for image n and the output of pixel (X,Y) for image m. This combination processing is carried out by either the comparatively dark combination processing section 21*b* or the adding/averaging processing section 21*c*.

The comparatively dark combination step S39 involves carrying out combination processing using comparatively dark combination processing or the averaging combination processing on the values of the brightness output value In (X, Y) for each pixel in the divided exposure image data n, and the brightness output value Sm(X, Y) for each pixel in the combined image data Sm, and newly creating combined image data Sm+1(X,Y) that has been generated the m+1$^{th}$ time.

In more detail, outputs of the brightness output value In(X, Y) for each pixel in the divided exposure image data n, and the brightness output value Sm(X, Y) for each pixel in the image data that have been subjected to combination processing the m$^{th}$ time, are compared, and the image data Sm+1(X, Y) after combination processing is made an output value that is the smaller output, or an average value of both (In(X, Y) and Sm(X,Y)).

If the result of determination in step S37 is that the comparatively bright flags of image m and image n have not both been set to 0, pixel replacement processing is carried out (S41). Specifically, output of pixel (X,Y) of image m is made the output of pixel (X,Y) of an image for which the comparatively bright flags of image m and image n are set to 1.

The pixel replacement processing of step S41 involves, of the values of the brightness output value In (X, Y) for each pixel in the divided exposure image data n, and the brightness output value Sm(X, Y) for each pixel in the combined image data Sm, using the brightness output values of images having the comparatively bright flag set to one, as brightness output values of newly create combined image data Sm+1 (X,Y) that has been generated the m+1th time.

In more detail, the image data Sm+1(X,Y) after combination processing takes a brightness output value either one of output of the brightness output value In(X, Y) for each pixel in the divided exposure image data n, or the brightness output value Sm(X, Y) for each pixel in the image data that have been subjected to combination processing the m$^{th}$ time, that has the comparatively bright flag set to 1.

If the combination processing has been carried out in steps S35, S39, or S41, it is next determined whether or not X is maximum (S51). Here, it is determined whether or not an X direction coordinate of the pixel is a maximum value for taken image size.

If the result of determination in step S51 is that X is not a maximum, X is set to X+1 (S53). In this case, since the end has not been reached in the X direction (horizontal direction), 1 is added to the X-coordinate of the pixel to shift the coordinate by 1 in the X direction, processing returns to step S31, the previously described determination for the comparatively bright flag is carried out for the pixel that has been shifted by 1, and combination processing is carried out.

On the other hand, if the result of determination in step S51 is that X is a maximum, X is set to 0 (S55). In this case, since the end has been reached in the X direction (horizontal direction), the X coordinate position is reset.

If X has been set to 0 in step S55, it is next determined whether or not Y is a maximum (S57). Here, it is determined whether or not a Y direction coordinate of the pixel is a maximum value for taken image size.

If the result of determination in step S57 is that Y is not a maximum, Y is set to Y+1 (S59). In this case, since the end has not been reached in the Y direction (vertical direction), 1 is added to the Y-coordinate of the pixel to shift the coordinate by 1 in the X direction, processing returns to step S31, the previously described determination for the comparatively bright flag is carried out for the pixel that has been shifted by 1, and combination processing is carried out.

On the other hand, if the result of determination in step S57 is that Y is a maximum, Y is set to 0 (S61). In this case, since the end has been reached in the Y direction (vertical direction), the Y coordinate position is reset. As well as carrying out reset of the pixel coordinates (X, Y) in this step, coordinates may be reset at the start of image combination processing. If the Y coordinate position has been reset, the flow for image combination processing is completed, and the originating flow is returned to.

In this way, in the image combination processing embodiment, combination processing is carried out for every coordinate (X, Y) within two-dimensional image data, using brightness output value In (X, Y) for each pixel in the divided exposure image data n, and brightness output value Sm (X, Y) for each pixel in the combined image data m.

Also, in the present embodiment, there is a memory section (memory for temporary storage 43*b*) for respectively holding pixel data for divided image data and pixel data for combined image data, it is determined whether or not brightness output for pixel data of divided image data and pixel data of combined image data are respectively within specified determination values (for example, S31, S33, S37 in FIG. 4), and either first image combination or second image combination is selected based on the result of determination relating to the divided image data and the result of determination on the combined image data (for example, S35 and S37 in FIG. 4).

Also, in the present embodiment, there is an operation section for determining determination threshold values (refer to the input section 30 and the setting section 51 in FIG. 2A), and determination is carried out based on determination threshold values that have been set using the operation section (refer, for example, to S31 in FIG. 4).

In step S31, the determination threshold values comprising a specified upper limit for pixel output (value shown by setting output 2) and a specified lower limit value pixel output (value shown by setting output 1) are not limited to being fixed to the values that have been set for the shooting initial state in step S1. In a case where the setting values (upper limit value, lower limit value) have been changed by operation of the input section 30 during shooting (steps S3 to S19), the determination threshold values are changed and a combined image (time-lapse image) is generated using these changed setting values.

With this embodiment, it is possible to vary setting values during shooting. Specifically, in this case, since a region (pixels) that is subjected to comparatively bright combination is updated for every incorporated image that is continuously shot (divided image), it is possible to increase or decrease trails in a subject region desired by the photographer.

Next, operation of the display processing in step S17 (refer to FIG. 3) will be described using the flowchart shown in FIG. 6. With this flow, in order to display an interim time-lapse image during shooting on the display section 17, an image for display Z is generated and image processing associated with this image for display Z is carried out.

If the flow for display processing is entered, it is first determined whether or not the comparatively bright flag of pixel (X,Y) of the image m is 1 (S71). Here, in generating a display object image, it is determined whether or not combination processing for each pixel (X,Y) of the combined image data after having been combined was comparatively bright combination. In more detail, it is determined whether the state of the comparatively bright flag corresponding to coordinate (X, Y) of the pixel data is 1 or 0.

If the result of determination in step S71 is that the comparatively bright flag is 1, special image processing, that can identify that comparatively bright combination has been carried out, is carried out (S73). Specifically, the periphery of that pixel of the image m, or that pixel, is subjected to special image processing, and that processed pixel is used in the image for display Z. In this case, since data for a pixel constituting an object is a pixel that has been subjected to comparatively bright combination processing, image data Sm(X, Y) that been subjected to combination processing, and display image data that has been obtained by subjecting an image represented by a region corresponding to the periphery of that coordinate (X, Y) to superimposing processing, are generated (refer to frame 55 in FIG. 2A).

On the other hand, if the result of determination in step S71 is that the comparatively bright flag is not 1, normal image processing is carried out and that processed pixel is used in the image for display Z (S75). In this case, since data for a pixel constituting an object is a pixel that has been subjected to comparatively dark or average combination processing, a display image Z is generated directly for the image data Sm(X, Y) that has been subjected to combination processing (an additional image for showing the region is not superimposed as with step S73).

If image data for the image for display Z has been generated in step S73 step S75, then in steps S77 to S87 the X coordinate and Y coordinate of the pixel are moved while being sequentially changed. This coordinate movement is the same as steps S51-S61 that were described previously, and so detailed description will be omitted.

Once image data for the image for display Z has been generated for all pixels of image m while sequentially changing the X coordinate and the Y coordinate, in steps S77 to S87, the image for display Z is next displayed (S89). Here, a time-lapse image is displayed on the display section 17 based on the image data for the image for display Z that has been generated. By looking at this time-lapse image, the photographer can monitor the taken image that varies with time. As described previously, in this case the photographer can increase or decrease trails for a desired subject region by changing setting values during shooting.

In this way, with the first embodiment of the present invention, combination processing for every pixel is selected using setting output 1 and setting output 2 for determination threshold values (in particular, refer to S31-S41 in FIG. 4). As a result it is possible to easily adjust the start point and length of arbitrary bright trails in accordance with the photographer's intentions.

With this embodiment, a setting area for a comparatively bright target is automatically determined from brightness output at each pixel of divided exposure image data that has been sequentially acquired so far using divided exposure, and state of all image data of combined image data that has been generated up to the present that constitutes in-progress image data. However, setting area for the comparatively bright target need not be both entire images, and a target may be only an image area of a specified region in both images that have been automatically set. Setting of the specified regions may be automatically determined using setting output and time information, location, scene recognition etc.

If comparative judgment is performed for setting outputs for all pixel data of both images, as in the first embodiment, there is an increase in the computational steps. By contrast, if comparative judgment is performed for setting outputs for image output of specified areas in both images, it is possible to realize a reduction in the computational steps. For example, in the case of a subject such as celestial bodies (stars), it is sufficient to perform comparative judgment of type of combination processing by specifying image areas in a starry sky region. Also, these images have a large difference in brightness output in specified image areas compared to brightness of a background image. It is possible to automatically set specified areas using scene recognition from this characteristic.

Next, a second embodiment of the present invention will be described using FIG. 7 to FIG. 11. With the first embodiment, if the lower limit threshold value and upper limit threshold value for brightness output level are changed during shooting, then after that combination processing will be selected in accordance with the changed threshold values and reflected in the time-lapse image. In other words, since combination processing prior to change was as it is, before change and after change of the threshold values, trails within a time-lapse image will be discontinuous midway through, and trails will be generated from the midpoint. In contrast, with the second embodiment divided image data that have been read out every time the divided exposure time elapses is independently stored, and if the threshold value is changed the combination processing is started again also using the divided image data before change. As a result, since threshold values are different before change and after change of the threshold values, stars etc. that are displayed are different, but the situation where trails are discontinuous at the midpoint and trails are generated from the midpoint does not arise.

The structure of the camera of this embodiment is the same as that of the first embodiment, and so detailed description is omitted (refer to FIG. 1). Operation of the combination processing section 21 and the memory for temporary storage 43b is different with this second embodiment. Specifically, the second embodiment differs in that (1) all divided exposure image data that has been sequentially acquired by divided exposure is saved in the memory for temporary storage 43b, and in that (2), in a case where the type of combination processing during exposure is changed by the photographer's operation, the divided exposure saved in (1) above is read out again from the first image, and combination processing is carried out again based on the changed combination processing type.

Figure 5:
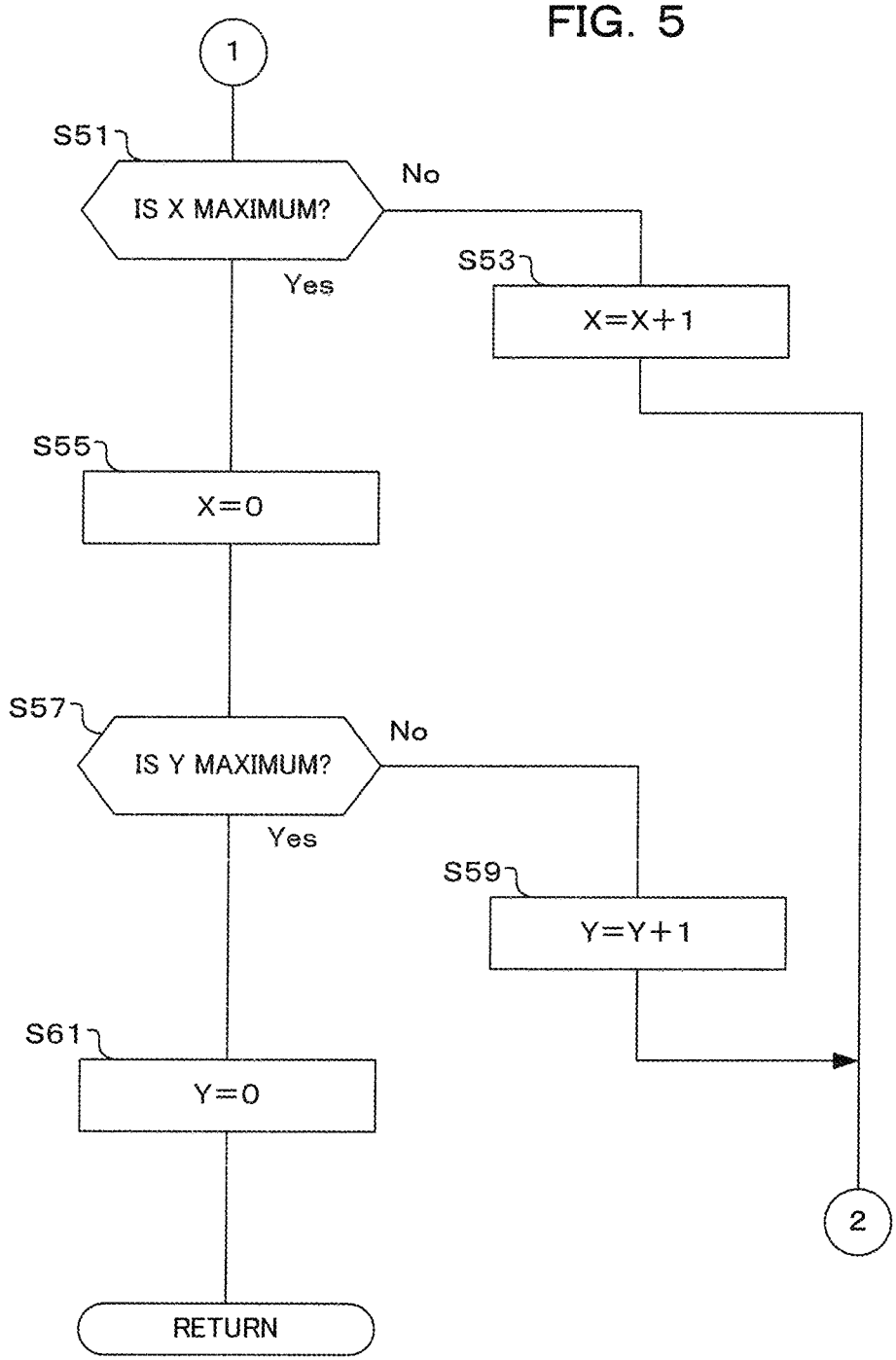
FIG. 5 is a flowchart showing operation of image combination processing for the camera of the first embodiment of the present invention.

Regarding flowcharts showing operations of the camera of this second embodiment, the flowchart shown in FIG. 6 relating to the first embodiment is the same as in this embodiment, but the flowcharts of FIG. 3 to FIG. 5 are replaced with the flowcharts shown in FIG. 8 to FIG. 11.

Figure 7:
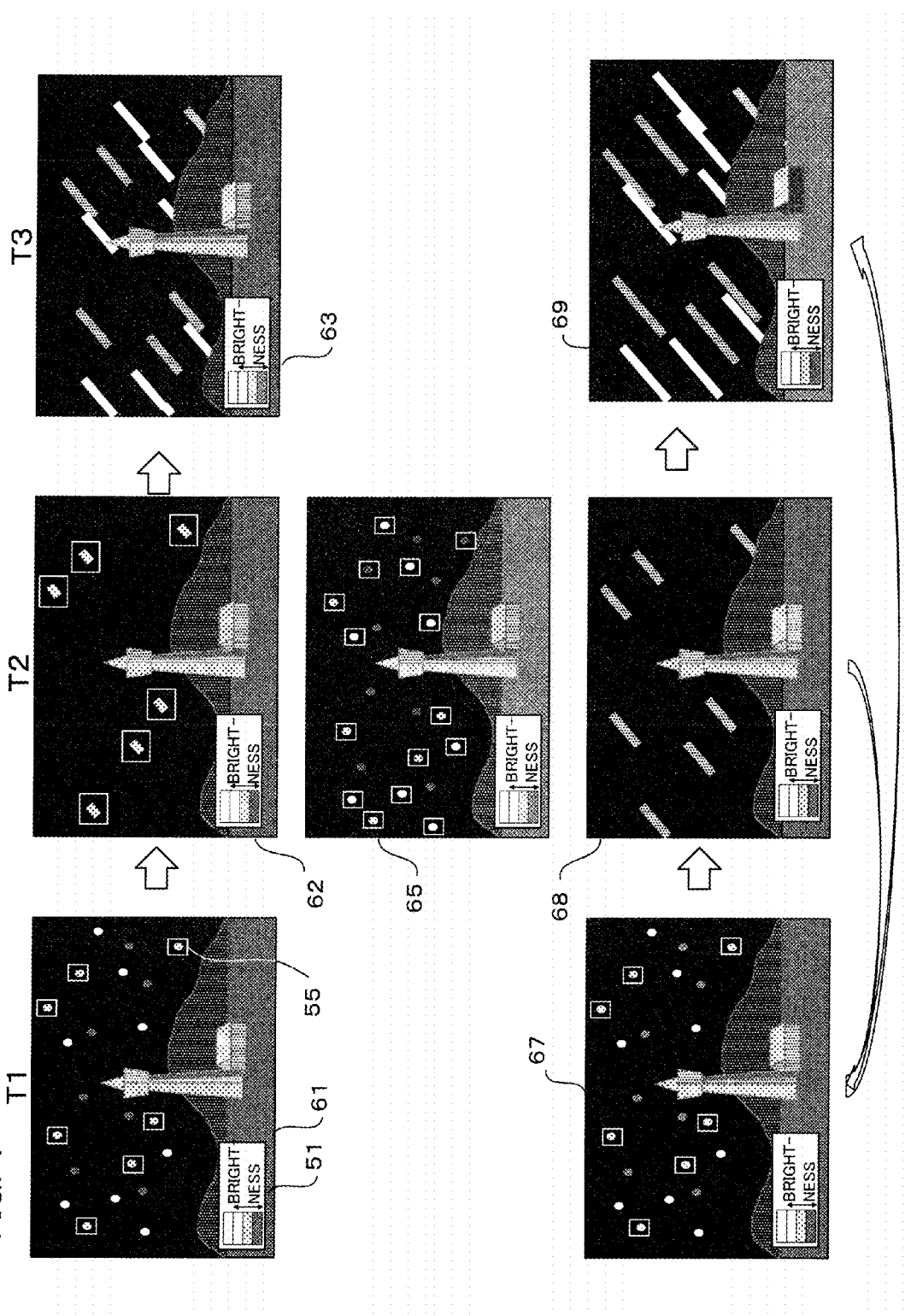
FIG. 7 shows combined images in the case of carrying out celestial body shooting, for a camera of a second embodiment of the present invention.

Before describing the operation of this embodiment using the flowcharts, change to the brightness range threshold values, and a combined image (time-lapse image) displayed as a result of this change, will be described using FIG. 7. Images 61-63, 65, and 67-69 shown in FIG. 7 are displayed on the display section 17 at the time of bulb shooting. Here, the images 61, 65 and 67 are subject images based on image data that has been acquired by divided exposure. The images 62, 63, 68 and 69 are combined images (time-lapse images) that have been generated by combining a plurality of image data from divided exposure. In FIG. 7, the word "setting" that was shown in FIG. 2A and FIG. 2B has been omitted from the setting section 51, but the word "setting" may also be described, similarly to FIG. 2A and FIG. 2B.

The photographer sets the lower limit threshold value LL (corresponding to setting output 1) and the upper limit threshold value HL (corresponding to setting output 2) on the setting section 51 while monitoring an image 61 (image 67) of the subject resulting from divided exposure that has been acquired at time T1 (refer to FIG. 2A regarding the lower limit threshold value LL and upper limit threshold value HL). Subjects (stars etc.) that are in this setting range are shown with a frame 55.

If time T2 is reached, a plurality of divided exposure image data using divided exposure are acquired, combination processing is performed by the combination processing section 21, and image 62 is displayed on the display section 17 as a time-lapse image. Then, if time T3 is reached, further combination processing is carried out using the divided exposure image data that has been acquired by divided exposure, and image 63 is displayed as a time-lapse image. Compared to the time-lapse image 62 for time T2, in time-lapse image 63 star trails will extend because time has passed. Also, since settings have been changed there will be more bright stars.

Looking at image 61 at time T1, after the lower limit threshold value LL and upper limit threshold value HL have been set, at the point in time where time T2 has been reached, the photographer looks at image 62 and may consider setting changes to the brightness level. In this case, setting of the brightness output level is changed on the setting section 51 while looking at image 65 that has been acquired by divided exposure. If the brightness output level setting is changed, in the event that all image data, from the first frame to the most recent, that has been acquired by divided exposure is stored in the memory for temporary storage 43b, the control section 10 reads out all image data, generates image data for a combined image (time-lapse image) by having the combination processing section 21 carry out combination processing using all of this image data, and displays the image 68 on the display section 17. On the other hand, if all image data from the first frame to the frame before the last frame has not been stored, a combined image is generated using combined image data that has been combined thus far and the most recent image data, and an image is displayed on the display section 17.

If time T3 is reached, image data for a combined image (time-lapse image) is generated using the upper limit value and lower limit value for brightness range after change, and using all image data from time T1-time T3, and image 69 is displayed on the display section 17.

In this way, with this embodiment, the setting of brightness range is changed partway through bulb shooting, image data for a combined image (time-lapse image) is generated again using all image data for divided exposures that have been stored up to that point, and using the brightness range after change, and an image is displayed based on that data. As a result, in a case where a photograph is not appearing as the photographer intended while looking at the time-lapse image, it is possible to perform changes so that the photograph falls into line with the photographer's intention by changing the settings.

Next, the main operation of this embodiment will be described using FIG. 8. Compared to the main operation of the first embodiment that was shown FIG. 3, with the second embodiment shown in FIG. 8 steps S9, S11 and S15 are replaced with S10, S12 and S16, and differs from the first embodiment in the point that step S20 has been added, with processing of other steps being the same. Description has been simplified by assigning the same step numbers to the same processes, and the description will center on points of difference.

Figure 8:
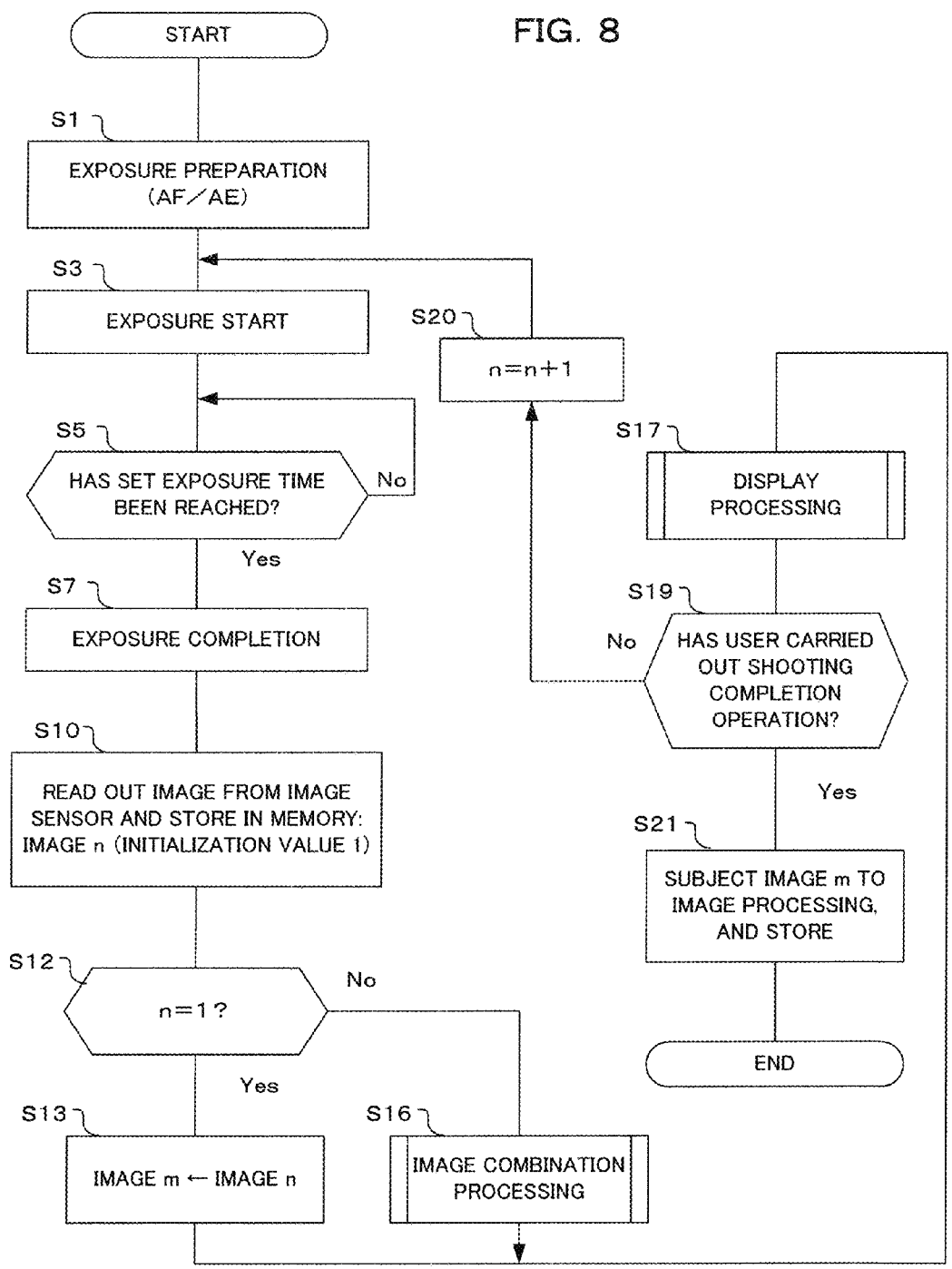
FIG. 8 is a flowchart showing main operation of the camera of the second embodiment of the present invention.

If the flow of FIG. 8 is entered and the photographer carries out a release operation, exposure preparation is carried out (S1), exposure is commenced (S3), and it is determined whether or not exposure time that has been set has been reached (S5). If the exposure time that has been set is reached, exposure using divided exposure is completed (S7).

Image data is read out from the image sensor, and saved to the memory for temporary storage 43b (S10). Image data of divided exposures that has been acquired at this time is sequentially stored in the memory for temporary storage 43b for every divided exposure. Here, image data acquired an $n^{th}$ time and that has been stored to the temporary storage memory 43b is made image n (n: divided exposure image data for an $n^{th}$ time that has been sequentially acquired by divided exposure, n=1, 2, . . . , initial value is 1). Accordingly, all divided exposure image data, from image 1 that has initially been acquired from the start of shooting to image n that has been acquired an $n^{th}$ time, are stored in the memory for temporary storage 43b. With the first embodiment the previous image data was overwritten every time divided exposure image data is acquired.

If image data has been read out and saved to the memory for temporary storage 43b in step S10, it is next determined whether or not n=1 (S12). Here it is determined whether or not a sequence number for image data of a divided exposure that was acquired in step S10 is that for an initially acquired image (n=1).

If the result of determination in step S10 is that n=1, then image n is moved to image m (S13). Specifically, image data for the divided exposure that was initially acquired is saved to the memory for temporary storage 43b as time-lapse image data (m).

On the other hand, if the result of determination in step S10 is that image n is not 1, image combination processing is carried out (S16). Here image combination is carried out by the combination processing section 21 using a plurality of image data. With the first embodiment image combination was carried out using image data for a preceding combined image (time-lapse image), and image data that has been acquired by divided exposure, but with the second embodiment, in the event that there has been brightness level change, image combination is carried out using image data for all divided exposures from the start. Detailed operation of this image combination processing will be described later using FIG. 9 to FIG. 11.

Once image movement has been carried out in step S13, or if image combination processing has been carried out in step S16, display processing is carried out (S17). Here display of a divided exposure image or a combined image (time-lapse image) is carried out based on image data of step S13 or S16. Details of this display processing have been described using FIG. 6, and so description is omitted.

If display processing has been carried out in step S17, it is determined whether or not the photographer has carried out shooting completion (S19), and if a shooting completion operation has not been carried out n is set to n+1 (S20). Here, a counter (n) for the number of items of image data for divided exposures that have been saved in the memory for temporary storage 43b is incremented by 1. If n has been set to n+1, processing returns to step S3, the next divided exposure is commenced, and as described previously a combined image (time-lapse image) is generated. In step S10, divided exposure image data is stored in the memory for temporary storage 43b using the value of n that has been incremented in this step.

On the other hand, if the result of determination in step S19 is that a shooting completion operation has been carried out, the image m is subjected to image processing and stored (S21). Image data (m) of the combined image (time-lapse image) that has been saved in the memory for temporary storage 43b is saved to the memory for image storage 43c as taken image data. If the image data has been saved, the main operation is completed.

Next, detailed operation of the image combination processing in step S16 (refer to FIG. 8) will be described using FIG. 9.

Before the description of the flowchart, state variables will be described. Here, similarly to the case of the first embodiment, image n is made divided exposure image data In that has been shot an $n^{th}$ time, and image m is made combined image data Sm that has been shot an $m^{th}$ time and subjected to combination processing. Pixel brightness outputs In(X,Y) and Sm(X, Y) that have been acquired from pixels corresponding to respective two-dimensional image coordinates (X, Y) are included in the divided exposure image data In and the combined image data Sm.

With this embodiment, as has been described previously, when carrying out combination processing using a plurality of image data that have been acquired using divided exposure, there are cases where the two types of combination processing are changed partway through. Therefore, in further carrying out the combination processing a comparatively bright determination variable J is provided as a state variable. The comparatively bright determination variable J is a value for counting a number of times comparatively bright combination processing has been selected as the combination processing when carrying out combination processing using divided exposure a plurality of times.

Also, similarly to the first embodiment, the comparatively bright flag is set as a state variable for determining the type of image combination. This variable is set to a value of 1 or 0. If the comparatively bright flag is set to 1, for image combination comparatively bright combination processing is carried out. On the other hand, if the comparatively bright flag has been set to 0, image combination processing is carried out using comparatively dark combination or average combination.

Figure 9:
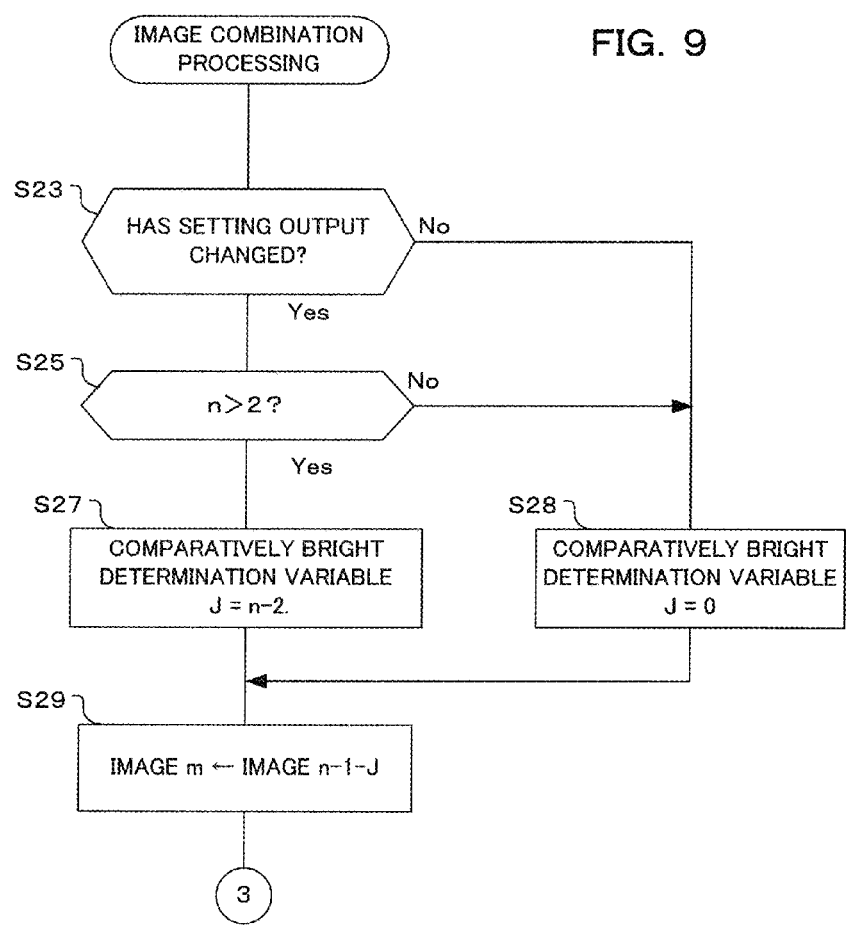
FIG. 9 is a flowchart showing operation of image combination processing for the camera of the second embodiment of the present invention.

If the flow for image combination processing showing in FIG. 9 is entered, it is first determined whether or not setting output has changed (S23). Here, it is determined whether or not determination threshold values (here, values of setting output 1 and setting output 2) used when determining the type of image combination (comparatively bright combination, comparatively dark combination), that is, determination threshold values for brightness output for divided exposure image data In and combined image data Sm, have been changed by the photographer.

If the result of determination in step S23 is that setting output has been changed, it is next determined whether or not n>2 (S25). In the event that the number of times of shooting with divided exposure is less than twice, then since there is effectively no need to correct combination processing from that of the first image, determination here is based on n representing the number of times shooting has been performed.

If the result of determination in step S25 is that n>2, the comparatively bright determination variable J is set to n−2 (S27). On the other hand, if the result of determination in step S23 is that setting output has not been changed, or if n>2 is not satisfied, the comparatively bright determination variable J is set to 0. As has been described previously, the comparatively bright determination variable J is a value for counting the number of times that comparatively bright combination processing has been selected as combination processing when carrying out combination processing using a plurality of divided exposures, and in a case where setting output has changed the initial value for the variable J is set in step S27, while an initial value for the variable j is set in case where setting output has not changed is set in S28.

If the value for variable J has been set in step S27 or S28, next image n−1−J is made image m (S29). Here, the combined image data Sm that was shot the $m^{th}$ time and has been subjected to combination processing is taken as a combined image data subjected to combination processing based on divided exposure image data that has been acquired up to the $(n-1-J)^{th}$ time, and saved to the memory for temporary storage 43b.

If movement of the image has been carried out in step S29, next comparison of the pixel data for image m and the setting output is carried out, and setting of the comparatively bright flag is carried out (S32). Processing in this step is analogous processing to that in step S31 of the first embodiment (FIG. 4), but differs in the point that variable J is considered. Here, the comparatively bright flag is set to 1 in the case where setting output 2>output of pixel (X,Y) of image m>setting output 1, or in the case where setting output 2>output of pixel (X,Y) of image n-J>setting output 1, and in any other case the comparatively bright flag is set to 0.

In this step S32, brightness outputs of respective two-dimensional coordinates (X, Y) for the divided exposure image data In that has been acquired an $n^{th}$ time by divided exposure, and combined image data Sm that was saved in step S29, are compared for every pixel output, and the type of image combination carried out for each pixel is determined. In this case, determination of a brightness output value In (X, Y) for each pixel of the divided exposure image data In, and a brightness output Sm value (X, Y) for each pixel of the combined image data Sm, is based on specified determination conditions. As the specified determination condition, a condition for the case where the comparatively bright flag has been set to 1 (that is, a case where comparatively bright combination is selected as the type of image combination), is shown.

If state setting of the comparatively bright flag has been carried out in step S32, then in step S34 and after, which of comparatively bright combination or comparatively dark combination, or replacement, is determined based on the state of the comparatively bright flag, and combination processing is carried out based on the determination result.

First, it is determined whether or not both the image m and the image n-J have the comparatively bright flag set to 1 (S34). Here, determination is carried out for every pixel, based on the comparatively bright flag that has had state set for every pixel in step S32.

If the result of determination in step S34 is that the comparatively bright flags of both image m and image n-J are set to 1, then comparatively bright combination is carried out for both image m and image n-J (S36). The processing here is analogous to the processing of step S35 (refer to FIG. 4) in the first embodiment. Output of pixel (X,Y) for image m is made the larger of the output of pixel (X,Y) for image n-J and the output of pixel (x, y) for image m. The processing for this case is carried out by the comparatively bright combination processing section 21a.

In more detail, combination processing is carried out using comparatively bright combination processing using the values of the brightness output value In (X, Y) for each pixel in the divided exposure image data n, and the brightness output value Sm(X, Y) for each pixel in the combined image data m, and combined image data Sm+1(X,Y) that has been generated the m+1th time is newly created.

On the other hand, if the result of determination in step S34 is that the comparatively bright flags of both image m and image n-J are not set to 1, it is next determined whether or not the comparatively bright flags of both image m and image n-J are set to 0 (S38). Here, determination is carried out every pixel, based on the comparatively bright flag that has been set for every pixel in step S32.

If the result of determination in step S38 is that the comparatively bright flags of both image m and image n-J are set to 0, then comparatively dark combination (or averaging processing) is carried out using both image m and image n-J (S40). The processing here is analogous to the processing of step S39 (refer to FIG. 4) in the first embodiment. Output of pixel (X,Y) of image m is made the smaller (or the average) of the output of pixel (X,Y) of image n-J and the output of pixel (X, Y) of image m. This combination processing is carried out by either the comparatively dark combination processing section 21b or the averaging processing section 21c.

In more detail, in step S40 combination processing is carried out using comparatively dark combination processing or averaging combination processing, using the values of the brightness output value In (X, Y) for each pixel in the divided exposure image data n, and the brightness output value Sm(X, Y) for each pixel in the combined image data m, and combined image data Sm+1(X,Y) that has been generated the m+1$^{th}$ time is newly created.

If the result of determination in step S38 is that the comparatively bright flags of image m and image n-J have not both been set to 0, pixel replacement processing is carried out (S42). The processing here is analogous to the processing of step S41 (refer to FIG. 4) in the first embodiment. Output of pixel (X,Y) of image m is made the output of pixel (X,Y) of an image for which the comparatively bright flags of image m and image n are set to 1.

The pixel replacement processing of step S42 involves replacing the values of the brightness output value In (X, Y) for each pixel in the divided exposure image data n, and the brightness output value Sm(X, Y) for each pixel in the combined image data Sm, with brightness output values of images having the comparatively bright flag set to 1, and newly creating combined image data Sm+1(X,Y) that has been generated the m+1$^{th}$ time.

In more detail, the image data Sm+1(X,Y) after combination processing are made a brightness output value of comparatively bright flag 1 by the outputs of the brightness output value In(X, Y) for each pixel in the divided exposure image data n, and the brightness output value Sm(X, Y) for each pixel in the image data that have been subjected to combination processing the m$^{th}$ time.

If combination processing has been carried out for every pixel in steps S36, S40 and S42, next, in steps S51-S61, combination processing is carried out for all pixels within a single screen while shifting the X-coordinate and Y-coordinate one by one. The processing in these steps S51-S61 is similar to the processing in steps S51-S61 in FIG. 5, and so detailed description is omitted.

If the result of determination in step S57 is that Y is maximum, then in step S61 Y is set to 0 and it is then determined whether or not J=0 (S63). Since all pixel outputs in the two-dimensional directions (X, Y) are subjected to combination processing, here determination is for the comparatively bright determination variable J. This comparatively bright determination variable J is a variable for, in a case where the photographer has changed threshold values of the brightness range part way through bulb shooting, counting the number of times of shooting when image combination is retroactively carried out again on the image of the initial divided exposure. If this variable J is 0, it is not necessary to retroactively carry out the image combination again on the initial divided exposure image, but if the variable J is 1 or more the image combination is carried out again.

If the result of determination in step S63 is not that J=0, then J is set to J−1 (S65). In this step, 1 is subtracted from the variable J, processing returns to step S32, and image combination is carried out in accordance with the brightness output level threshold value. This image combination is repeatedly carried out until J=0 becomes true. If the result of determination in step S63 is that J=0, the flow for image combination processing is completed and the originating flow is returned to.

In this way, with the second embodiment of the present invention, divided exposure image data is stored in the memory for temporary storage 43b every time divided exposure is carried out at the time of bulb shooting (S10 in FIG. 8), and in a case where the photographer has changed a brightness output level threshold value for determination (yes in S23 of FIG. 9) all image data are read out from divided exposure image data that has been initially taken at the time of bulb shooting, combined image processing is selected based on threshold value for every pixel, image data for a combined image (time-lapse image) is generated (S27 in FIG. 9 to S65 in FIG. 11), and the combined image is displayed on the display section 17 (S17 in FIG. 8). At the point in time where bulb shooting has been completed, a final combined image (time-lapse image) is stored in the memory for image storage 43c as a final image (S21 in FIG. 8).

Figure 10:
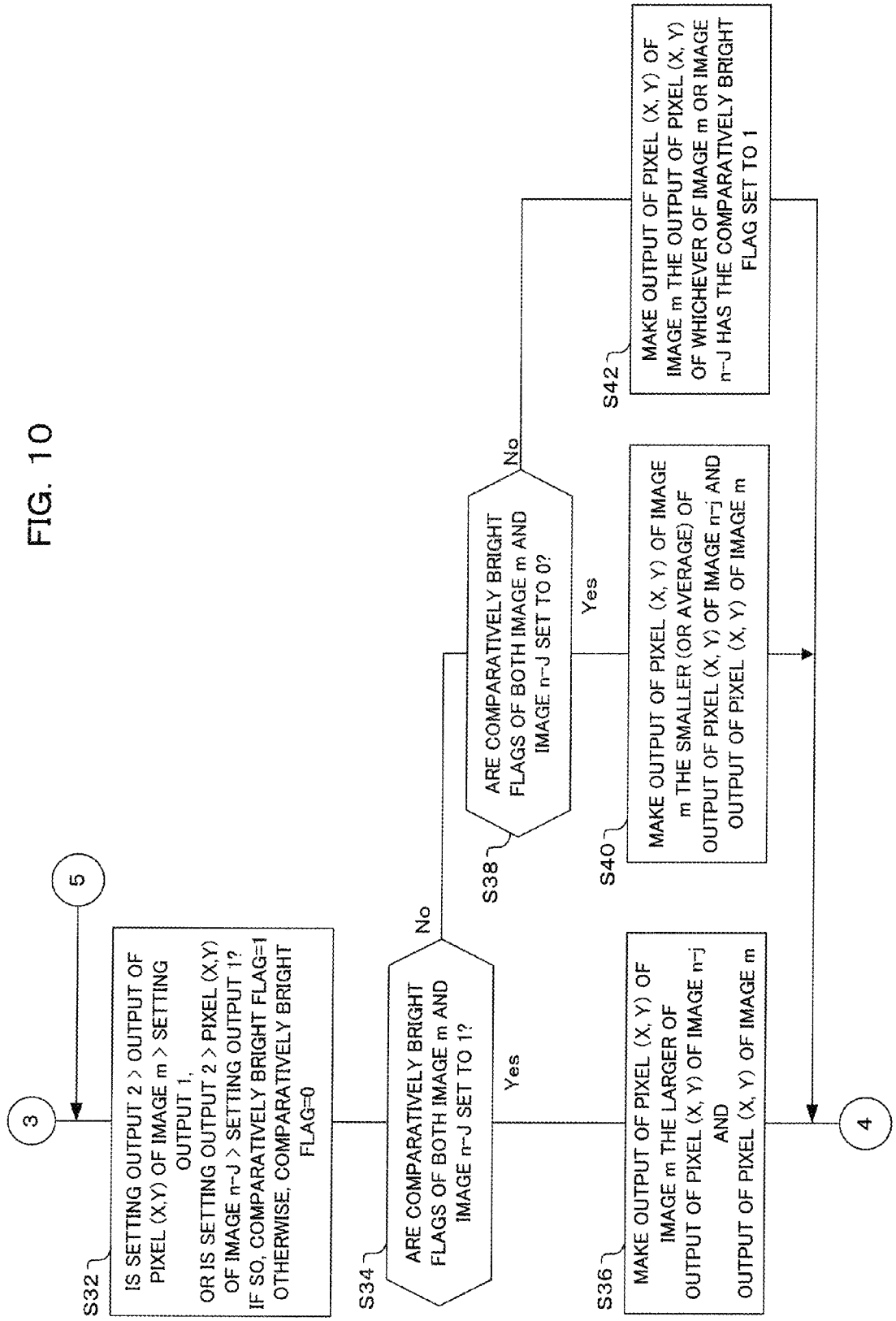
FIG. 10 is a flowchart showing operation of image combination processing for the camera of the second embodiment of the present invention.
Figure 11:
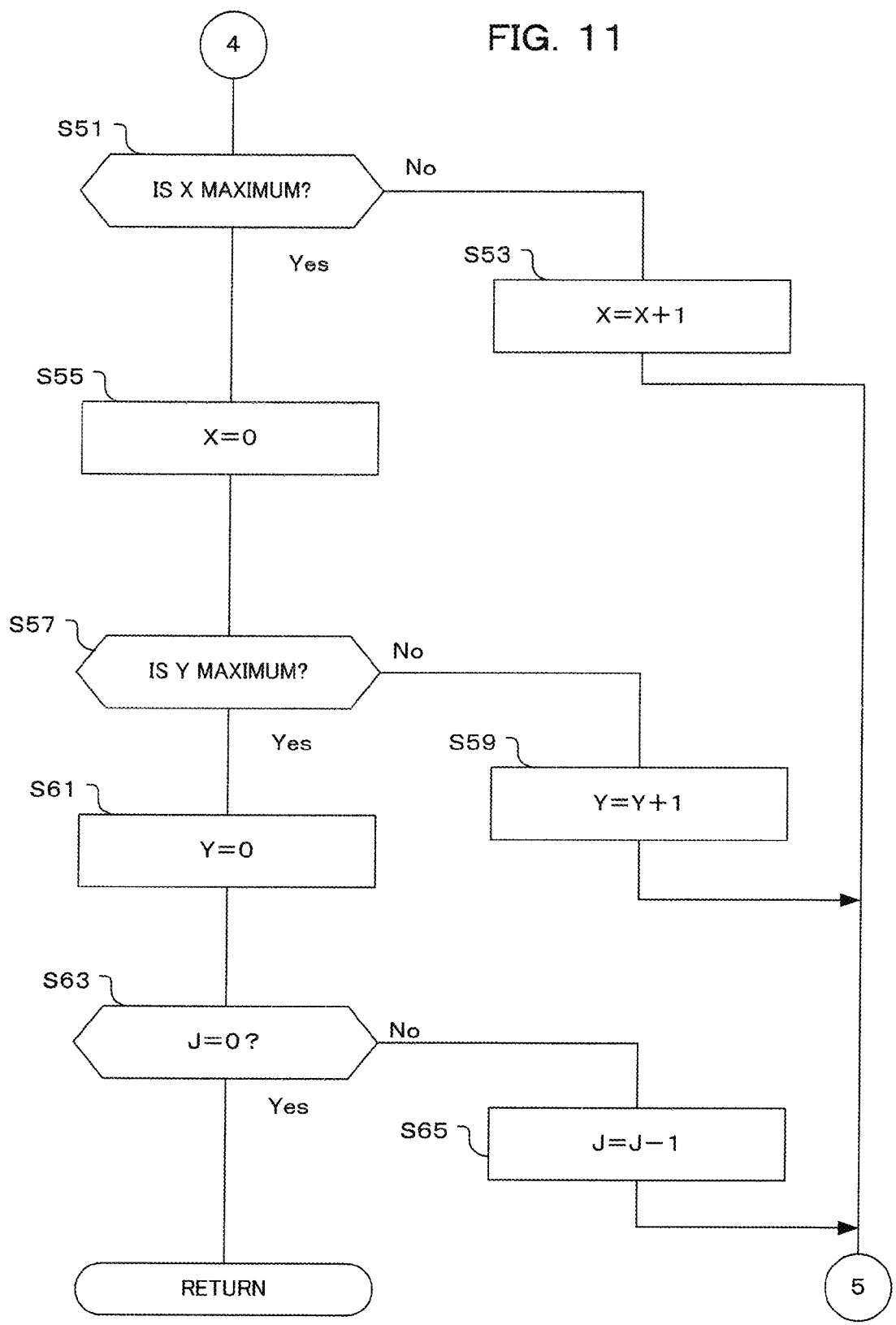
FIG. 11 is a flowchart showing operation of image combination processing for the camera of the second embodiment of the present invention.

Specifically, with this embodiment, there is a memory for storing divided image data for each of a plurality of exposures (memory for temporary storage 43b), and when a plurality of exposures are being carried out, in a case where a new determination threshold value has been set using an operation section, the image combination control section carries out combination processing again on divided image data for each of the plurality of exposures that are stored in the memory for temporary storage 43b, using the new determination threshold value (refer, for example, to FIG. 9 and FIG. 10).

As a result, during bulb shooting the photographer monitors a time-lapse image, and in the event that the resulting image is not as they intend, it is possible to bring about a photograph in line with the photographer's intentions by changing a brightness output level threshold value for determination.

As has been described above, with each of the embodiments and modified examples of the present invention, for every pixel data of image data of a divided exposure it is determined whether or not that pixel data is within a specified determination threshold value, and the type of image combination is changed based on the result of this determination. This makes it possible to give an image that is in line with the photographer's intentions at the time of bulb shooting.

With each of the embodiments and modified examples of the present invention, both an upper limit threshold value and a lower limit threshold value have been set for the brightness range for determination. However, for brightness determination a brightness range above the threshold value or a brightness range below the threshold value may be used. Only one brightness range has been described, but two or more brightness ranges may be set. For example, it is possible to photograph dark subjects and bright subjects, but not photograph subjects of an intermediate brightness.

Also, with each of the embodiments and modified examples of the present invention, threshold values for the brightness range for determination have been set, but it is also possible to set RGB threshold values for determination for every pixel data, and not just brightness. In this case, it becomes possible to shoot a photograph of subjects of a particular color, for example, only trails of blue stars, or trails of red stars. In this case, selection screens of the setting screens shown on the display section 17 are appropriately changed and displayed.

Further, with each of the embodiments and modified examples of the present invention, threshold values for brightness range for determination have been set, but this is not limited to brightness information, and time information, location information, and scene recognition information may also be used. As a specific example, subject information, being shooting time, location, shooting direction, are detected by the detection section 41 with a GPS sensor 35, timer 37 and inclination sensor 33 within the input section 30, and after acquiring information such as star direction and sky brightness, rough values constituting threshold values for the brightness range for determination may be set.

Also, with each of the embodiments of the present invention, the AE processing section 13, AF processing section 15, image processing section 20 and detection section 41 etc. are constructed separately from the control section 10, but some or all of these sections may be constituted by software, and executed by a microcomputer within the control section 10.

Further, with these embodiments, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC), tablet type computer, game console etc. In any event, it is possible to adopt the present invention as long as a device carries out combination processing using a plurality of image data.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
an input device that receives a user input for setting at least one determination threshold value;
a first processor that includes
a shooting control section that executes control to cause a subject image that has been formed on an imaging surface of an image sensor to be subjected to photoelectric conversion and to acquire divided image data for each of a plurality of exposures, and
a determination section that determines, for every pixel data of the divided image data that has been acquired for each of the plurality of exposures, whether or not a pixel value is within a specified determination threshold value, wherein the determination section carries out determination based on the at least one determination threshold value that has been set using the input device;
a second processor that includes
an image combination section that carries out a first type of image combination or a second type of image combination, which is different from the first type of image combination, for every pixel data of the divided image data,
wherein the first processor further includes
an image combination control section that selects, for each pixel of the respective divided image data, either the first type of image combination or the second type of image combination based on a determination result by the determination section, performs image combination for every pixel data in the image combination section in accordance with this selection by performing the selected one of either the first type of image combination or the second type of image combination, and generates combined image data; and
a first memory that stores the combined image data that has been generated as a result of control by the image combination control section.

2. The imaging device of claim 1, wherein:
the first type of image combination includes, for a first exposure, storing divided image data that has been acquired by the first exposure as combined image data, and for a second and subsequent exposures, comparing, for each pixel position, brightness of pixel data of the second or subsequent image and brightness of pixel data of the most recent combined image data, selecting, for each pixel position, pixel data for which brightness output is larger, and carrying out combination processing as new combined image data; and
the second type of image combination includes, for a first exposure, storing divided image data that has been acquired by the first exposure as combined image data, and for a second and subsequent exposures, comparing, for each pixel position, brightness of pixel data of the second or subsequent image and brightness of pixel data of the most recent combined image data, selecting, for each pixel position, pixel data for which brightness output is smaller, and carrying out combination processing as new combined image data.

3. The imaging device of claim 1, further comprising:
a second memory that respectively saves pixel data of the divided image data and pixel data of the combined image data for every exposure, and wherein
the determination section, for a first exposure, does not determine whether or not brightness outputs of each pixel data of divided image data that has been acquired in the first exposure are within a specified determination threshold value, and for second and subsequent exposures, respectively determines whether or not brightness output of pixel data of the divided image data and pixel data of the combined image data are within a specified determination threshold value, and
the image combination control section selects either the first type of image combination or the second type of image combination based on a determination result relating to the divided image data and a determination result for the combined image data.

4. The imaging device of claim 1, further comprising:
a second memory that stores the divided image data for each of a plurality of exposures, and wherein
when carrying out a plurality of exposures, in a case where new threshold values have been set by the input device, the image combination control section carries out combination processing again for divided image data for each of a plurality of exposures that are stored in the second memory, using the new determination threshold values.

5. The imaging device of claim 1, further comprising:
a display that performs updated display of the combined image every time the combined image data is generated by the image combination control section.

6. The imaging device of claim 1, further comprising:
a display that displays a combined image based on the data, and wherein
the display displays a position, that has been determined by the determination section to be within specified threshold values, superimposed on the combined image.

7. The imaging device of claim 1 wherein the pixel value is a brightness of the pixel, the first type of image combination is comparatively bright combination and the second type of image combination is comparatively dark combination.

8. The imaging device of claim 1 wherein the at least one determination threshold value received as user input via the input device includes a set upper limit value and a set lower limit value, and
wherein the determination section determines, for every pixel data of the divided image data that has been acquired for each of the plurality of exposures, whether or not each pixel value is within a range defined by the set upper limit value and the set lower limit value that were received as user input via the input device.

9. A shooting method comprising:
receiving a user input for setting at least one determination threshold value;
an imaging step executes control to cause a subject image that has been formed on an imaging surface of an image sensor to be subjected to photoelectric conversion and to acquire divided image data for each of a plurality of exposures;
determining, for every pixel data of the divided image data that has been acquired for each of the plurality of exposures, whether or not a pixel value is within the at least one determination threshold value that has been received;
selecting either a first type of image combination or a second type of image combination, which is different from the first image combination, based on a determination result in the determination step;
carrying out image combination for every pixel data in accordance with the selection to generate combined image data by applying the selected one of either the first type of image combination or the second type of image combination; and
storing the combined image data that was generated.

10. The shooting method of claim 9 wherein the pixel value is a brightness of the pixel, the first type of image combination is comparatively bright combination and the second type of image combination is comparatively dark combination.

11. The shooting method of claim 9 wherein the at least one determination threshold value received as user input includes a set upper limit value and a set lower limit value, and
wherein the act of determining, for every pixel data of the divided image data that has been acquired for each of the plurality of exposures, whether or not a pixel value is within the at least one specified determination threshold value by determining whether or not each pixel value is within a range defined by the set upper limit value and the set lower limit value that were received as user input.

12. A non-transitory computer-readable medium storing a computer program for controlling a computing device, instructions of this program comprising:
- receiving a user input for setting at least one determination threshold value;
- an imaging step executes control to cause a subject image that has been formed on an imaging surface of an image sensor to be subjected to photoelectric conversion and to acquire divided image data for each of a plurality of exposures;
- determining, for every pixel data of the divided image data that has been acquired for each of the plurality of exposures, whether or not a pixel value is within the at least one determination threshold value that has been received;
- selecting either a first type of image combination or a second type of image combination, which is different from the first image combination, based on a determination result in the determination step;
- carrying out image combination for every pixel data in accordance with the selection to generate combined image data by applying the selected one of either the first type of image combination or the second type of image combination; and
- storing the combined image data that was generated.

13. A non-transitory computer-readable medium of claim 12 wherein the pixel value is a brightness of the pixel, the first type of image combination is comparatively bright combination and the second type of image combination is comparatively dark combination.

14. A non-transitory computer-readable medium of claim 12 wherein the at least one determination threshold value received as user input includes a set upper limit value and a set lower limit value, and
- wherein the act of determining, for every pixel data of the divided image data that has been acquired for each of the plurality of exposures, whether or not a pixel value is within the at least one specified determination threshold value by determining whether or not each pixel value is within a range defined by the set upper limit value and the set lower limit value that were received as user input.

* * * * *